United States Patent [19]

Kazemzadeh

[11] Patent Number: 5,772,721
[45] Date of Patent: Jun. 30, 1998

[54] PROCESS FOR PRODUCING ODORLESS ORGANIC AND SEMI-ORGANIC FERTILIZER

[76] Inventor: Massoud Kazemzadeh, 10025 Beard Ave. So., Bloomington, Minn. 55431

[21] Appl. No.: 561,376

[22] Filed: Nov. 21, 1995

[51] Int. Cl.$^6$ .................................................. C05F 11/08
[52] U.S. Cl. ........................... 71/11; 71/15; 71/21; 71/22; 71/64.04; 71/64.13; 71/904; 241/2
[58] Field of Search .................................. 71/11, 15, 21, 71/22, 64.04, 64.13, 904; 241/2

[56] References Cited

U.S. PATENT DOCUMENTS

| | | | |
|---|---|---|---|
| 2,977,213 | 3/1961 | Maluta et al. | 71/41 |
| 3,655,395 | 4/1972 | Karnemaat | 71/28 X |
| 3,939,280 | 2/1976 | Karnemaat | 426/2 |
| 4,136,486 | 1/1979 | Franklin, Jr. et al. | 47/58 |
| 4,150,965 | 4/1979 | Van Hijfte et al. | 71/27 |
| 4,245,396 | 1/1981 | Maffet | 34/12 |
| 4,551,164 | 11/1985 | Tenzer | 71/6 |
| 4,704,160 | 11/1987 | McVey et al. | 71/92 |
| 4,861,721 | 8/1989 | Waterbury et al. | 435/252.1 |
| 4,956,295 | 9/1990 | Sudoma | 435/252.1 |
| 4,997,469 | 3/1991 | Moore | 71/11 |
| 5,009,696 | 4/1991 | Fujita et al. | 71/64.07 |
| 5,089,041 | 2/1992 | Thompson et al. | 71/64.11 |
| 5,113,619 | 5/1992 | Leps | 47/57.6 |
| 5,147,441 | 9/1992 | Megeed | 71/7 |
| 5,147,442 | 9/1992 | Kosuge et al. | 71/64.07 |
| 5,229,291 | 7/1993 | Nielsen et al. | 435/252.2 |
| 5,252,116 | 10/1993 | Markham et al. | 71/13 |
| 5,310,785 | 5/1994 | Hayakawa et al. | 71/64.07 |
| 5,354,349 | 10/1994 | Inoue | 71/9 |
| 5,360,466 | 11/1994 | Witmer et al. | 71/15 |
| 5,401,291 | 3/1995 | Inoue | 71/9 |

*Primary Examiner*—Ferris Lander
*Attorney, Agent, or Firm*—Frederick W. Niebuhr

[57] ABSTRACT

A substantially odorless and sterilized fertilizer in pellet form is produced by combining a dry organic waste material and a dry binder material, then combining the resulting dry mixture with steam, water and/or further organic waste in the form of sludge. The resulting material is provided to an extruder for a more thorough, dispersive mixing, a pressure increase to at least 100 psi, and heating above the glass transition temperature of the binder, and more preferably to at least about 125° C. to substantially sterilize the material mass. The extruded material is forced through a die and released to an ambient environment, rapidly reducing pressure of the material and thereby lysing spores and microorganisms surviving conditions within the extruder. The emerging material is segmented and dried, or segmented and tumbled to form pellets, then dried. When dried to a moisture content of at most 7%, the pellets further can be inoculated with an active agent within an adhesive, resulting in a final moisture content of 10–14%.

10 Claims, 1 Drawing Sheet

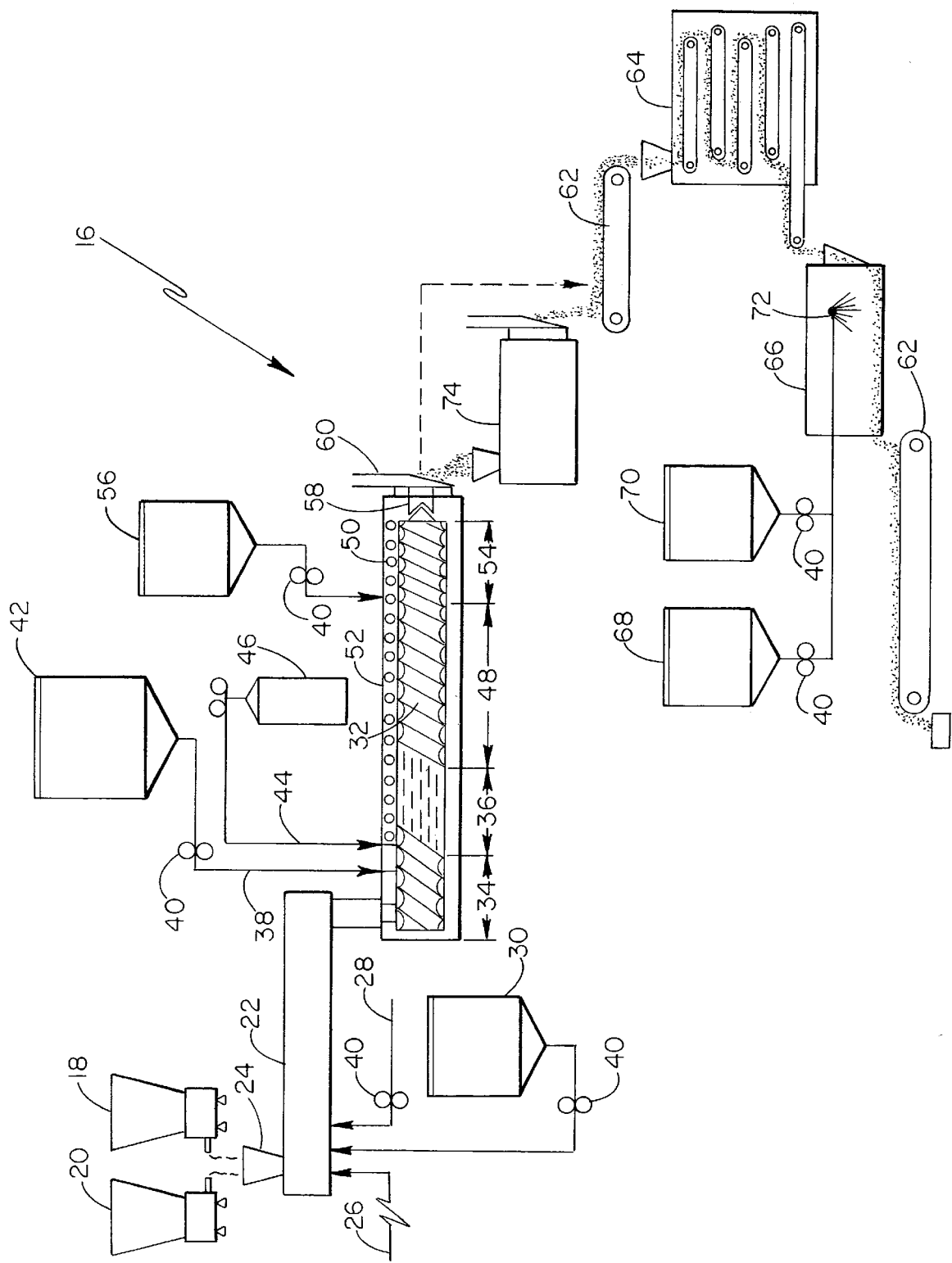

5,772,721

PROCESS FOR PRODUCING ODORLESS ORGANIC AND SEMI-ORGANIC FERTILIZER

BACKGROUND OF THE INVENTION

The present invention relates to the production of organic and semi-organic fertilizers from organic and inorganic materials, and more particularly to a process for mixing and working components to form a substantially odorless and sterile fertilizer, preferably in pellet form.

The treatment and disposal of agricultural waste has become an increasingly complex problem, due in part to the increase in consumption of certain protein sources and a concentration of consumer choices on certain sources of protein. As one example, there has been a substantial increase in the consumption of poultry, particularly turkey meat, as well as pork. The increase in demand for these meat sources has led to increased production of these animals, frequently in restricted and smaller areas. These practices concentrate livestock waste on smaller acreages, increasing the magnitude and difficulty of waste disposal and treatment. At the same time, environmental laws have become more stringent, with compliance becoming more difficult. Treatment of certain waste materials, such as avian and other animal carcasses, has become prohibitively costly. Landfills are diminishing as a viable option, due to run off and water table contamination problems. Chitin from shell fish harvests and ash from burners, also present disposal problems.

Generally, the application of agricultural waste products or raw sewage to agricultural land is no longer a responsible option, given the potential harm to the environment. Agricultural and municipal wastes have been processed in incubative facilities, known as composting facilities, where such wastes are degraded using aerobic microorganisms. The process is time-consuming and produces noxious odors that affect employees most directly, but also affect those living and working near such facilities, despite extensive filtering systems to remove the odors. Another problem is the possible spread of disease, both within such facilities and beyond the facilities due to carriage by the organic fertilizers.

Recently, the U.S. Environmental Protection Agency has promulgated rules governing treatment of municipal waste and the application or incorporation of treated wastes onto or into the ground. Where waste sludge is to be applied to land surfaces, or incorporated into soil under certain conditions of expected public access or consumption of livestock raised on the land, a "process to significantly reduce pathogens" (PSRP) is required. Currently approved PSRP's include aerobic and anaerobic digestion, air drying, composting and lime stabilization. The regulations further require a "process to further reduce pathogens" (PFRP) where crops for direct human consumption are to be grown. Currently approved PFRP's include composting at elevated temperatures, heat drying, heat treatment and thermophilic aerobic digestion. The approved processes take extended time, are prohibitively expensive, or both.

The prior art includes a variety of approaches to treating organic waste. For example, U.S. Pat. No. 3,939,280 (Karnemaat) discloses a process for treating poultry manure including adjusting its pH downwardly to about 5.5–6.0, mixing formaldehyde or a formaldehyde-releasing substance into the manure, adding 2–10 weight percent urea in granular form, then allowing the mixture to dry. The resulting product is said to be free of pathogenic bacteria.

U.S. Pat. No. 5,354,349 (Inoue) discloses a method for manufacturing organic fertilizers by fermentation of organic waste, alone or mixed with a cellulose-containing organic material. The materials are sheared and kneaded in a screw conveyor to activate thermophilic microorganisms, and pulverized in air to activate aerobic microorganisms. The product is then fermented by thermophilic microorganisms at a temperature greater than 40° C. for more than five hours. The process is said to create composts of good quality and without bad odor, manufactured within a "short time".

Inoue's process including five hours of fermentation is indeed short, compared to the process for producing fertilizer disclosed in U.S. Pat. No. 5,360,466 (Witmer et al). Llama pellets, preferably from llamas that have been fed only alfalfa hay with grain supplements, are dried in trays over a course of several days, then ground into a particulate mass. The end product, either in powdered or granular form, is said to have an alfalfa-like scent.

While the above and other previously known approaches have their advantages, they also either fail to substantially reduce odor, or are unduly time-consuming and expensive.

Therefore, it is an object of the present invention to provide a process for manufacturing substantially odor free organic and semi-organic fertilizers from organic waste materials, for general use and for more specialized applications such as mushroom farms.

Another object is to provide an organic or semi-organic fertilizer in a highly stable, pelletized or granular form for ease in handling, that is readily activated by contact with water.

A further object is to provide a continuous process of short duration, for mixing organic waste material and a carbohydrate binder and working the binder/organic waste mixture under high pressure and temperature conditions to form a substantially homogeneous and substantially sterile matrix severable into pellets or granules of fertilizer.

Yet another object is to provide a sterilized, cohesive and stable fertilizer matrix that retains its stability and form when subject to handling and is amenable to inoculation with nitrogen-fixing bacteria or other useful agents.

SUMMARY OF THE INVENTION

To achieve these and other objects, there is provided a process for producing a substantially odorless organic or semi-organic fertilizer, including the following steps:

a. combining organic waste material and a carbohydrate binder material into a material mixture, with a moisture content of the material mixture being in the range of 18–65% moisture, by weight;

b. mechanically working and dispersively mixing the material mixture, and heating the material to at least a glass transition temperature of the carbohydrate binder material;

c. further heating the material mixture, under a maximum pressure of at least 100 psi, to a maximum temperature of at least 100° C. to at least substantially sterilize the material mixture; and d. abruptly reducing the pressure from said maximum pressure to effect a lysing of any organisms surviving exposure to the maximum pressure and maximum temperature.

In a high shear process, the heating step may be accomplished largely by applying mechanical energy to knead and shear the material mixture. More preferably, however, the process is not necessarily high shear, and the requisite heating is accomplished through conduction, convection or both, e.g. using heating jackets or channels in a cooking extruder in which the material mixture is mechanically worked.

The preferred binder includes a high amylopectin starch, e.g. a wheat starch in the range of 4–93%, by weight, and more preferably about 25%. Hydrocolloids can be added in the range of 1–4%. Fly ash or ash, preferably in the range of 15–60%, provides potassium in the fertilizer. Protein binders, e.g. a soya concentrate, also can form part of the binder, as can wood flour. Baking soda, calcium carbonate and lime can be added to reduce odor and reduce bulk density of the finished pellets by facilitating expansion of the end product.

In general, the process involves treating biological or organic wastes, including byproducts and waste products from agricultural systems, to produce granulated or pelletized fertilizer which can be directly applied to farmland as a low odor or no odor, high grade fertilizer. Inorganic elements and other ingredients and compounds may be added for mixture within the pellets or as surface coatings. Extrusion is the preferred form of mechanical mixing and can involve a single screw, twin screw or multi-screw extruder, to process the material mixture within a low shear to high shear environment. The result is a continuous, formed matrix mass which, when it exits from a die at the end of the extruder, is shaped into pellets or granules. The granules are sterile or semi-sterile, with very low microbial activity and high fertilizer values which can be tailored to a given requirement. The fertilizer pellets can be treated by means of coating, drying, and inoculating, resulting in a final moisture level of 5–14%, by weight.

Because of the high heat, short duration and relatively high pressure of the process, the end product becomes sterile or semi-sterile, with no organisms that cause odor due to the method of their degradation of the fertilizer. Biopolymers within the mixture are provided in quantities sufficient for their formation of a continuous matrix as they reach the glass transition point, at which time they reach a totally amorphous phase involving extensive cross bonding including hydrogen and covalent bonding. The extruded product exhibits a considerable reduction in pathogenic organisms and has little or no vector attractiveness. The amorphous biopolymers behave as encapsulating agents against the odor-forming pathogens and organisms, substantially reducing or eliminating noxious odors often associated with organic waste. Specifically, a presence of amylopectin starch at levels of 5–25% of the total mass effectively inhibit odors, thus rendering the final product highly acceptable to the end user. Odors are substantially reduced at fertilizer processing facilities, a benefit to workers and neighbors alike.

The fertilizer-producing process involves mixing of dried poultry waste or other waste with a liquid slurry waste, and further mixing dry biopolymer binders. Liquid slurry wastes can include urine from hog farms and sludge slurries from waste processing plants, or starch slurries from food or paper producing facilities. Particularly preferred biopolymer binders are products of wet milling, e.g. wheat starch or corn starch. Other suitable binders include gelatins and hydrocolloids, for example xanthan, guar, gum aerobic, carboxymethyl cellulose, cellulose ethers and lignosulfonate. The biopolymer binding also can incorporate additives, e.g. ash or fly ash, to produce an end product high in potassium and a material mixture with greater water absorption capacity.

Further sources of organic waste usable in this process include dried mixtures of fish meal, feather meal, poultry byproducts, dead animal carcasses, blood meal, animal waste and clean sewage free of heavy metals and harmful chemicals. To a certain extent, waste streams from questionable sources that may contain non-degradable heavy metals or marginally acceptable compounds, can be used in this process, because the fertilizer when applied over a large area of farmland sufficiently dilutes undesirable components.

The preferred binders are starches, with hydrocolloids added to prevent retrogradation of the starch. Other suitable binders include proteins of various sources such as gluten, zein, casein, bencel and albumin.

The material mixture, at 18–65% moisture, is provided to an extruder and enters a mixing zone, followed by a compression and shear zone, and finally a melt zone where the temperature not only exceeds the glass transition temperature of the binder, but is sufficient for sterilization to occur, e.g. about 125°–185° C. In the melt zone the material mixture, by then an amorphous matrix or mass, is subject to pressure of at least 100 psi, more preferably 700–800 psi. The mass is extruded through a die having screen-like orifices, at which point the matrix experiences a rapid pressure drop. At this point it is cut to given lengths and thereafter tumbled to form rounded pellets. The pellets may contain moisture levels of 5–35% or higher upon leaving the extruder. Accordingly they are dried to a moisture level of 5–18%, and more preferably to 5–7% moisture.

Optionally, an inoculation step follows, in which the pellets are coated with a desired additive, e.g. a nitrogen-fixing bacteria. Suitable adhesives for the inoculation or encapsulation include pre-gelled carbohydrates, slurries of sugars, dextrose, malto-dextrose, modified cellulose such as methocels, carboxymethocels, ether methocels, gums and hydrocolloids. If the pellets have been dried to 5–7% moisture prior to inoculation, no drying is required subsequent to inoculation, with the coated pellet having a final moisture content in the range of 10–14 percent by weight, thus providing a shelf stable fertilizer.

The process incorporates adjustment of the moisture content and pH of the material mixture, since these characteristics can vary considerably with the nature of the biological waste employed. For example, poultry excreta has a pH in the range of 7.0–9.0 and contains from 70–85% moisture. Within 24–48 hours of its collection from a farm, flora and unstable ammonia-containing compounds, in combination with the high moisture content, tend to raise the pH. Chicken manure, air dried, has a moisture content of about 11%, by weight. As another example, a waste slurry from a paper mill is likely to have a high percentage of starch, reducing the proportion of starch required in the binder.

As it is conditioned and moved through the extruder, the material mix undergoes a change in phase from a powder, to a dough, to a high compression and high viscosity dough, and finally to a substantially or completely sterilized pellet. During the process, binder materials in the presence of abundant moisture, are subject to a combination of mechanical, convective and conductive energy sufficient to induce a glass transition phase change for the binder and any other materials in the matrix having substantially equal or lower glass transition temperatures. This produces a continuous matrix within the high pressure zone of the extruder, forming a cohesive mass. Upon exit from the extruder, the mass undergoes a rapid pressure drop. The mass does not fall apart, but holds together as it is cut into pellets or granules. The sterile or semi-sterile pellets have an excellent shelf life and remain stable until, after their application to a field, they are exposed to moisture.

BRIEF DESCRIPTION OF THE DRAWING

For a further appreciation of the above and other features and advantages, reference is made to the following detailed description in conjunction with the drawing FIGURE, which shows a system for producing fertilizer in accordance with the present invention.

DETAILED DESCRIPTION OF THE PREFERRED EMBODIMENTS

With reference to the drawing, there is shown a system 16 for producing sterile or semi-sterile fertilizer pellets, based on various forms of biological waste. Organic waste can be provided to the system dry (e.g. in pelletized or powdered form) as a liquid slurry, or both. Salts, minerals, acids or bases can be provided, and either synthetic or naturally-occurring biodegradable polymers are provided to form a binder.

For receiving dry materials, system 16 includes a pre-mix hopper 18 for dried organic waste, and a pre-mix hopper 20 for a binder material. Both of the materials are low in moisture content and preferably are in powdered form. A variety of organic waste materials can be provided to hopper 18, including dried poultry waste and other animal waste, fish meal, feather meal, byproduct of poultry operations including avian carcasses, other animal carcasses, blood meal, and sewage, provided it is substantially free of non-degradable heavy metals and toxic chemicals.

Hopper 20 is loaded with a dry carbohydrate binder material, and a variety of additives if desired. The primary, preferred binder material is a high amylopectin starch, e.g. wheat starch, corn starch, potato or rice starch, any of which is readily obtainable as a byproduct of wet milling. Protein binders such as soya concentrates can be employed, as well as modified cellulose binders, e.g. carboxymethyl cellulose, and cellulose ethers. Hydrocolloids, preferably at about 1–4% of the binder, by weight, are added to prevent retro-gradation of the starch granules. Examples of hydrocolloids include guar gum, xanthan gum, alginate, gelatins, gum aerobic.

Dry additives to enhance fertilizer quality also may be added at this stage. For example, the addition of ash or fly ash can be added to enhance the potassium content of the final fertilizer pellet.

The material outputs of hoppers 18 and 20 are combined and provided to a conditioner 22 via a feeding device 24, where the dry material mix can be combined with steam via an inlet 26, water from a supply 28, and further organic waste in the form of a liquid slurry from a tank 30. Respective pumps 40 supply the water and an organic waste slurry. The inputs to conditioner 22 are combined by paddle mixers or otherwise, for about 30 seconds to about 4 minutes, to provide an organic waste and binder mass with a moisture content in the range of about 18–65%, by weight.

The material mass then is provided to a cooking extruder 32. While extruder 32 is shown to have a single screw, twin screw or multiple screw extruders also can be employed. Extruder 32 processes the material mass through several stages as the material proceeds from left to right as viewed in the FIGURE. First, the material mass enters a conveying zone 34, along which the mixture is not tightly packed and typically incorporates substantial air space or unoccupied volume, e.g. 25–75%. Material is conveyed, at from ambient temperature to about 200° F., depending on the amount of steam provided to conditioner 22. Some mixing occurs at this stage.

Next, material proceeds to a mixing zone 36 where the materials are more thoroughly mixed in dispersive fashion. The material becomes substantially more uniform, as larger solids are either squeezed apart or crushed. The material is heated somewhat by this mechanical working and may reach or exceed a glass transition temperature of the binder, e.g. 78°–85° C. in the case of starches, depending largely on the amount of water and amylose versus amylopectin in the starch.

Several inputs are shown to extruder 32 along the mixing zone, including a line 38 over which a pump 40 provides aqueous ammonia from a reservoir 42. Also shown is a line 44 through which ammonia gas is supplied from a tank 46.

While shown together for convenience in illustration, either ammonia input alone is sufficient. When ammonia is supplied to the material along mixing zone 36, proteins in the material tend to bond easily with the ammonia, minimizing loss of ammonia at the extruder exit although a slight ammonia odor is present at the exit. Gaseous ammonia, when added to the material mix, is captured by moisture within the material and absorbed or bonded, again by proteins. Regardless of whether gaseous or liquid ammonia is used, nitrogen content of the fertilizer pellets is enhanced.

From mixing zone 36 the material proceeds to a heating zone 48. Along the heating zone, the screw pitch can be reduced, if desired, to increase the pressure at least to 100 psi, although higher pressures, preferably 700–800 psi, may be used. The material mix is further squeezed and crushed and experiences shear as well, which tends to increase its temperature, depending on the degree of shear. This zone may include dispersing blocks and a reverse screw pitch to enhance mechanical working, as well as steam locks. To ensure sufficient heating, especially at lower pressures, heating channels 50 are formed within wall 52 of the extruder. The heating channels conduct a heated liquid, thus to heat the material mix by a combination of convection and conduction through wall 52 into the extruder.

The material mix is heated to a temperature sufficient to substantially or completely sterilize the material mass. Typically, the product mass is heated at least to about 125° C., although temperatures as low as about 100° C. can suffice, depending on the material mix. On the other hand, material proceeding through zone 48 may reach temperatures as high as 190° C.

A salient feature of the carbohydrate binder is that it combines with the organic waste components to form a continuous, highly uniform and highly viscous matrix. Extruder processing of organic waste material has been found unsatisfactory, with the fiber and excrements within the waste material causing considerable wear and tear on the extruder and resulting in non-cohesive pellets. Adding moisture to lubricate the organic waste material has not solved the problem. While considerable additional moisture provides effective lubrication, it also prevents the desired shearing of the material by reducing the material's viscosity. In accordance with the invention, the organic waste and binder form a matrix that is readily sheared with minimal wear and tear on the extruder. To a certain extent, viscosity of the matrix can be controlled by selecting the starch or other binder material. Starches with high amylopectin content tend to provide a more viscous matrix, while high amylose starches provide less viscosity.

From heating zone 48, the matrix enters a melting zone 54 along which the matrix pressure and temperature tend to increase. Along the melting zone is an injection port for providing a neutralizing agent, typically acidic due to the higher pH (up to about 9) of the material processed through the extruder. A pump 40 is used to supply the neutralizing agent from a tank 56 to the injection port. Phosphoric acid is highly preferred as a neutralizing agent, because it increases the phosphorous in the final fertilizer pellet, enhancing the fertilizer value. Near the downstream end of melting zone 54, the matrix has a pressure of at least 100 psi, and more preferably in the range of about 700–800 psi, and its temperature is at or near its maximum, i.e. in the range of 100°–190° C.

In leaving melting zone 54, the material matrix passes through a die 58 with small, screen-like orifices (not shown) that shape the matrix into strands of about several millimeters in diameter. Depending on the makeup of the matrix material, it may expand as it exits the die. In any event, the material undergoes a substantial and abrupt reduction in pressure, effectively lysing spoors or organisms that may have withstood the pressures and temperatures within extruder 32. As the material strands emerge from the die, a reciprocating knife 60 cuts the strands into segments.

At this point the segments include moisture at 5–30%, by weight. The segments are provided to an extruder press or fast tumbler 74, where the segments become more rounded and pelletized in form. Segments or pellets exiting tumbler 74 can be cut into smaller pieces as indicated, if desired, then provided to a conveyor 62. Conveyor 62 transports the pieces to a dryer 64, where moisture content is reduced to 5–18%. More preferably, if a subsequent inoculation or encapsulation step is contemplated, moisture is reduced to 5–7%.

From dryer 64, the material segments can be provided to a tumbler 66, where they are further rounded and shaped into fertilizer pellets. Inoculation can occur at this stage, with an agent or additive provided from container 68 through a pump 40, and a liquid adhesive provided from a container 70 via a pump 40. Both liquids are provided to the pellets within tumbler 66 through a sprayer 72. The adhesive ensures adherence of the additives to the exterior surfaces of the pellets and may include pregelled carbohydrates, slurries of sugar, dextrose, malto-dextrose and modified cellulose such as methocels, carboxymethocels, ether methocels, gums and hydrocolloids. A variety of additives can be applied to the pellets, e.g. a nitrogen-fixing bacteria to enhance pellet decomposition after the fertilizer is applied to a field. Other additives include hormones suitable for enhancing growth of the plants, herbicides, and insecticides.

Inoculated pellets exit tumbler 66 to a conveyor 62, where they are loaded into containers, one of which is shown in the FIGURE.

The following twenty-four examples are arranged in eight categories, including ash, wood fiber, protein, wheat starch, CMC gum, baking soda, calcium carbonate and lime. Each composition includes three examples. The primary binder components tested were wheat starch and a soya concentrate. Some compositions consisted of binder, while in other compositions included binder plus waste. Wood flour was used as the organic waste component.

| ASH | | | |
|---|---|---|---|
| | Compositions | | |
| | 1 | 2 | 3 |
| Wheat Starch | 83% | 68% | 38% |
| Fly Ash | 15% | 30% | 60% |
| Carboxymethyl Cellulose | 2% | 2% | 2% |
| | 100% | 100% | 100% |

As the ash concentration increased to 60%, the pellets became lighter, but held their cohesiveness throughout the test. At 60% ash, the pellets can easily be tumbled for further processing for coating. At lower ash content of 15%, the product was difficult to cut, and the starch tended to smear.

| WOOD FIBER | | | |
|---|---|---|---|
| Wheat Starch | 93% | 88% | 83% |
| Wood Flour | 5% | 10% | 15% |
| CMC | 2% | 2% | 2% |
| | 100% | 100% | 100% |

The wood fiber not only reduced the bulk density of the pellet, but also increased the water requirement up to 75%. As the wood flour increased, pellets became less cohesive and at 15% the product was forming a pellet but generating fines during coating. The temperature of the product increased greatly from 115° C. to 135° C., therefore expanding the pellets threefold.

| PROTEIN | | | |
|---|---|---|---|
| Wheat Starch | 93% | 88% | 78% |
| Soya Concentrate | 5% | 10% | 20% |
| CMC | 2% | 2% | 2% |
| | 100% | 100% | 100 |

All of the pellets were dense and well formed. At 20% concentration of Soya, the pellets were the most dense. They held their shape throughout the coating, with no fines generated. The addition of protein builds a matrix within the extrudate by which the pellet can be handled with little damage.

| WHEAT STARCH | | | |
|---|---|---|---|
| Wheat Starch | 7% | 11% | 22% |
| Soya Concentrate | 31% | 29% | 26% |
| Wood Flour | 31% | 29% | 26% |
| Ash | 31% | 29% | 26% |
| | 100% | 100% | 100% |

The addition of wheat starch from 7% to 22% provided excellent bonding material for the pellet. It also provided excellent expansion at higher values of 22%. At 7% wheat starch, the pellets were irregular, and were not holding together well. The wood flour at 31% was considered to be extremely high.

| CMC GUM | | | |
|---|---|---|---|
| Wheat Starch | 6% | 5% | 6% |
| Soya Concentrate | 31% | 31% | 30% |
| Wood Flour | 31% | 31% | 30% |
| Ash | 31% | 31% | 30% |
| CMC | 1% | 2% | 4% |
| | 100% | 100% | 100% |

With the addition of increased gum from 1% to 4%, the pellets became more consistent and held together well. It should be noted that whenever there is the addition of wood flour beyond 10% to 15%, the product does not hold together well and cannot be extruded at too high a temperature. It also would require up to 100% moisture to be added to the mixture.

| MIXTURES + BAKING SODA | | | |
|---|---|---|---|
| CMC | 1% | 1% | 1% |
| Wheat Starch | 4% | 10% | 19% |
| Soya concentrate | 31% | 29% | 26% |
| Wood Flour | 31% | 29% | 26% |
| Ash | 31% | 29% | 26% |
| Baking Soda | 2% | 2% | 2% |
| | 100% | 100% | 100% |

The ideal product was achieved in Sample #3. Although the pellets were easily shattered and showed expansion of 3 to 5 times that of the die hole size, they were porous, low density and could be easily handled for surface coating. Moisture levels ranged from 50% to 150% for all samples tested.

| CALCIUM CARBONATE (CaCO$_3$) | | | |
|---|---|---|---|
| CMC | 1% | 1% | 1% |
| Wheat Starch | 7% | 5% | 7% |
| Soya Concentrate | 29% | 28% | 24% |
| Wood Flour | 29% | 28% | 24% |
| Ash | 29% | 28% | 24% |
| Calcium Carbonate | 5% | 10% | 20% |
| | 100% | 100% | 100% |

The addition of calcium carbonate from 5 to 20% was detrimental to the characteristics of the entire extrudate. The product had to be extruded at much lower temperatures in order for the pellets to hold together. Best results were achieved at 5%.

| LIME | | | |
|---|---|---|---|
| CMC | 1% | 1% | 1% |
| Wheat Starch | 7% | 5% | 7% |
| Soya Concentrate | 29% | 28% | 24% |
| Wood Flour | 29% | 28% | 24% |
| Ash | 29% | 28% | 24% |
| Lime | 5% | 10% | 20% |
| | 100% | 100% | 100% |

The results of the above show that by the addition of lime, the pH of the extrudate increased, thereby reducing the glass transition of both wheat starch and soya concentrate. This allowed the extrudate to produce a well developed matrix at lower temperatures of approximately 100° C. The product tended to smear and to be extremely elastic at 20% concentration. An ideal product was achieved at 5%, in which the pellets could be easily handled, with formation of few fines. This product can then be easily coated or further processed to form small 1–3 mm pellets.

The resulting pellets are substantially or completely sterilized and highly stable due to their low moisture content. Even following inoculation, moisture content remains in the range of 10–14%, provided that the pellets were dried to 5–7% moisture before encapsulation. The pellets consist essentially of organic waste material in combination with a binder including a high amylopectin starch at 4–93%, by weight, ash or fly ash at 15–60%, a hydrocolloid at 1–4%. Other suitable components of the binder include, soya concentrate at 5–31%, wheat or corn flour or starch at 5–29%.

Despite their stability when dried, the fertilizer pellets readily break down when exposed to moisture, providing an effective, high quality fertilizer to suit a wide variety of applications.

What is claimed is:

1. A process for forming a substantially odorless fertilizer from organic waste material, comprising:
   combining an organic waste material and a binder material consisting essentially of a carbohydrate or a protein, with moisture to provide a mixture material including 18–65% moisture, by weight;
   mechanically working the mixture material to dispersively mix the mixture material while heating the mixture material to at least a glass transition temperature of the binder material, to form an amorphous, substantially uniform matrix;
   while maintaining the matrix at a temperature above the glass transition temperature, further mechanically working and mixing the matrix within an anaerobic environment while heating the matrix to increase its temperature to at least 100° C. and increasing its pressure to at least about 100 psi; and
   expelling the matrix from the anaerobic environment to an ambient environment, thus to abruptly reduce the pressure of the matrix to an ambient level, thereby lysing spores and organisms carried by the matrix whereby the expelled material is substantially sterilized.

2. The process of claim 1 wherein:
   the further working of the matrix includes increasing its pressure to within the range of 700–800 psi.

3. The process of claim 1 wherein:
   said heating increases the temperature of the matrix to at least 125° C.

4. The process of claim 1 wherein the matrix is mechanically worked within an extruder and expelled as an extrudate, and further including:
   after the expelling of the extrudate, severing the extrudate into segments and tumbling the segments to form fertilizer pellets of the matrix material.

5. The process of claim 4 further including:
   drying the extrudate after forming the extrudate into the pellets.

6. The process of claim 5 wherein:
   the pellets are dried to about 5–7% moisture, and subsequently inoculated with a coating including an adhesive and an agent carried by the adhesive.

7. The process of claim 1 further including:
   after said expelling the matrix, drying the matrix to reduce its moisture content to about 5–18%, by weight.

8. A process for manufacturing a low odor fertilizer, including:
   combining organic waste material with a binder material into a mixture at 5–35% binder material, said binder material including at least one of a high amylopectin starch and a protein, and further including up to 4% hydrocolloids;
   mechanically working and heating the resulting mixture material in an anaerobic environment to dispersively mix the material and increase its temperature to at least about 100° C., and to increase its pressure to at least about 100 psi, to substantially sterilize the material;
   after said mechanical working, removing the material from the anaerobic environment, thereby abruptly reducing pressure of the material to lyse any organisms surviving sterilization; and cutting the material to form cohesive fertilizer pellets.

9. The process of claim 8 wherein:
   the mechanically working and heating of the resulting mixture increase its temperature to at least about 125° C.

10. The process of claim 1 further including adding ammonia to the mixture material during said mechanical working.

* * * * *